United States Patent Office 3,450,733
Patented June 17, 1969

3,450,733
COMPLEXES OF $B_9H_{14}^-$ OR $B_9H_{12}S^-$ WITH SELECTED METALS AND PHOSPHINES
Frank K. Klanberg, Wilmington, Del., assignor to E. I. du Pont de Nemours and Company, Wilmington, Del., a corporation of Delaware
No Drawing. Filed Dec. 13, 1966, Ser. No. 601,326
Int. Cl. C07f 9/50, 5/02
U.S. Cl. 260—430     9 Claims

ABSTRACT OF THE DISCLOSURE

Complexes of selected metals, phosphines, and one of the anions $B_9H_{14}^-$ or $B_9H_{12}S^-$ wherein the metal is copper, silver or gold and the organic group of the phosphine is aryl or alkaryl. These complexes are prepared by reacting a salt of the polyboron anion with a salt of the metal in the presence of the phosphine and an inert solvent. The compounds are useful as metal film-plating agents.

---

This invention relates to novel metal-organic compounds. More specifically, the invention concerns complexes of $B_9H_{14}^-$ or $B_9H_{12}S^-$ with certain metals and phosphines, and to a method for their preparation.

The novel complexes of this invention are compounds represented by the formula $$(R_3P)_3MZ$$

wherein Z represents a polyboron anion selected from the class consisting of $B_9H_{14}^-$ and $B_9H_{12}S^-$; M represents a metal selected from the class consisting of copper, silver and gold; P represents phosphorus; and each R represents a group of 6–12 carbon atoms selected from the class consisting of aryl and alkaryl. The R groups can be the same or different.

The novel compounds of the invention are prepared by reacting a salt of the polyboron anion (Z) with a salt of the metal (M) in the presence of the phosphine ($R_3P$) and in inert solvent.

More specifically, the polyboron reactant can be represented by the formula M'Z, i.e., $M'B_9H_{14}$ or $M'B_9H_{12}S$ wherein M' is a cation selected from the class consisting of alkali metal and $R'_nNH_{4-n}$ wherein $n$ is a cardinal number of 0–4, inclusive, and the cations R' is lower alkyl. The R' groups in the cation $R'_nNH_{4-n}$ can be the same or different and are represented by tert-butylammonium, diisopropylammonium, triethylammonium, tetramethylammonium, and the like.

The anionic portion of the metal salt of M depends upon which metal M represents. For example, when M is copper (II), the metal salt reactant can be represented by the formula $CuX_2$ wherein X is one equivalent of an anion selected from the class consisting of chloride, bromide, nitrate, sulfate, formate, acetate, lactate and tartrate. When M is silver, the metal salt reactant can be represented by the formula AgX' wherein X' is one equivalent of an anion selected from the class consisting of nitrate, acetate, sulfate and fluoride. Lastly, when M is gold, the soluble metal salt reactant can be represented by the formula $AuX_3''$ wherein X'' represents an anion such as chloride or bromide; or by the formula $M''AuX_4''$ wherein M'' is alkali metal and X'' is defined as above. Because of their greater solubility, nitrate and fluoride are preferred X' values.

For convenience, the process is usually carried out at room temperatures, e.g., 20–30° C., or slightly higher temperatures, e.g., up to 50° C. The latter range is sometimes useful for effecting increased dissolution of some of the reactants. The temperature range, however, is not critical and higher or lower temperatures may be used, but present no advantage.

Pressure is not critical and solely for convenience, atmospheric pressure is ordinarily employed.

Nor is the ratio of reactants critical. Usually, for optimum results, approximately stoichiometric ratios are used. As seen in the examples, the order of addition of the reactants is not critical and they can be combined in any sequence or all mixed together simultaneously.

Operable solvents include water, polar organic solvents that are at least partially miscible with water, and mixtures of the two. Examples of such polar organic solvents include lower alkanols such as methanol, ethanol and isopropyl alcohol; cyclic ethers such as dioxane and tetrahydrofuran; open-chain polyethers such as 1,2-dimethoxymethane and di(2-ethoxyethyl)ether; and lower alkanenitriles such as acetonitrile and propionitrile.

All products of the invention are relatively insoluble in the reaction medium and usually precipitate immediately when all the reactants are in mutual contact. The product can they be isolated by filtration and purified by recrystallization as shown in the examples.

Representative polybaron reactants include $NH_4B_9H_{12}S$, $NH_4B_9H_{14}$, $NaB_9H_{12}S$, $NaB_9H_{14}$, $KB_9H_{12}S$, $KB_9H_{14}$, $LiB_9H_{14}$, $LiB_9H_{12}S$, and the like. Preferably, the cation M' is cesium. The reactant $CsB_9H_{12}S$ can be prepared by dissolving sulfur (6 g.) in warm aqueous ammonium sulfide (500 ml., 20%), and cooling, filtering and treating the resulting solution with decaborane(14) (24 g.) while stirring and cooling in an ice bath. The decaborane is added slowly and when addition is complete, excess 50% aqueous cesium fluoride is added and the resulting precipitate is collected by filtration and recrystallized from water to give $CsB_9H_{12}S$. $RbB_9H_{12}S$ can be prepared by replacing the cesium fluoride with rubidium fluoride. The ammonium and the other alkali metal salts of $B_9H_{12}S^-$ can be prepared from the cesium salt by conventional cation exchange techniques.

The same cations as listed in the foregoing paragraph are also representative of the cations of the $B_9H_{14}^-$ salts used in the process of this invention. The $M'B_9H_{14}$ salts can be prepared generally as described in Benjamin et al., J. Amer. Chem. Soc. 85, 2674 (1963). The salts described therein can be subjected to cation exchange to obtain all the M' cation salts.

Representative phosphines ($R_3P$), both as reactants and complexed ligand groups in the compounds of the invention, include triphenylphosphine, tritolylphosphine (o, m- and p), tris(2,5-xylyl)phosphine, tris(2,4,6-trimethylphenyl)phosphine, phenyldi-p-tolylphosphine, diphenyl-p-tolyl phosphine, tris(1-naphthyl)phosphine, tris(biphenylyl) phosphine, and the like.

The novel compounds of this invention are colorless crystalline solids with definite melting points.

The products and process of this invention are illustrated in further detail in the following examples:

EXAMPLE 1

[$(C_6H_5)_3P]_3CuB_9H_{12}S$

A solution of $CsB_9H_{12}S$ (3 g.) in 30 ml. of ethanol was added to a mixture of triphenylphosphine (8 g.) and $CuSO_4$ (1.6 g.) in 150 ml. of ethanol and 50 ml. of water. A white precipitate formed, which was separated and recrystallized first from 100 ml. of tetrahydrofuran and then from 90 ml. of 1,2-dimethoxyethane. The yield was 3.0 g. of colorless crystals of [$(C_6H_5)_3P]_3CuB_9H_{12}S$ which had a melting point of 166–167° C. with decomposition.

*Analysis.*—Calcd. for $C_{54}H_{57}B_9CuP_3S$: C, 65.4; H, 5.8; P, 9.4; B, 9.8; S, 3.2; Cu, 6.4. Found: C, 65.2; H, 6.4; P, 8.8; B, 9.8; S, 3.1; Cu, 6.2.

The product was diamagnetic with an observed diamagnetic susceptibility of $10^3\chi_{mole}=-0.55\pm0.03$; the calculated diamagnetic susceptibility obtained by a summation of the atomic increments expressed as Pascal constants was $10^3\chi_{mole}=-0.61\pm0.02$.

A sample of $[(C_6H_5)_3P]_3CuB_9H_{12}S$ prepared in the manner described above was found to have an ultraviolet absorption spectrum of $$\lambda_{max}^{CH_3CN}=2750 \text{ A. } (\epsilon, 19230), 2620 \text{ A. } (\epsilon, 21950).$$

The $B^{11}$ nuclear magnetic resonance spectrum showed a broad plateau with a maximum of 54 p.p.m. The infrared absorption spectrum (KBr wafer) showed B-H absorption at 2555 cm.$^{-1}$ (terminal hydrogen) and 2200 cm.$^{-1}$ (bridging hydrogen).

EXAMPLE 2

$[(C_6H_5)_3P]_3AgB_9H_{12}S$

A solution of $CaB_9H_{12}S$ (2.7 g.) in 40 ml. of a 1:1 by volume mixture of ethanol and water was added to a solution containing 15 g. of triphenylphosphine and 1.7 g. of silver nitrate. The solid that precipitated was extracted with 300 ml. of warm tetrahydrofuran. The mixture was filtered and the filtrate was concentrated until crystals precipitated. This crystalline solid was separated and dissolved in 300 ml. of warm chloroform. Reduction of the volume to 50 ml. with chilling caused a solid to precipitate. The solid was separated by filtration and dried to give 5.6 g. of small while crystals of $[(C_6H_5)_3P]_3AgB_9H_{12}S$, which darkened above 180° C. and melted with decomposition at 190–192° C.

*Analysis.*—Calcd. for $C_{54}H_{57}AgB_9P_3S$: C, 62.2; H, 5.5; P, 9.0; B, 9.4; Ag, 10.4; S, 3.1. Found: C, 62.5; H, 5.8; P, 8.7; B, 9.5; Ag, 10.6; S, 3.2.

The infrared absorption spectrum (KBr wafer) showed B-H absorption at 2555 and 2425 cm.$^{-1}$ (terminal hydrogen) and at 2275 cm.$^{-1}$ (bridging hydrogen).

EXAMPLE 3

$[(C_6H_5)_3P]_3AuB_9H_{12}S$

Triphenylphosphine (6 g.) in 100 ml. of ethanol was added to a solution of $NaAuCl_4\cdot 2H_2O$ (3 g.) in 40 ml. of a 3:1 by volume mixture of ethanol and water. A small amount of solid precipitated. The mixture was filtered, and to the filtrate was added 2 g. of $CsB_9H_{12}S$, dissolved in a mixture of 20 ml. of ethanol and 10 ml. of water. A white precipitate was obtained which was collected and recrystallized from 40 ml. of 1,2-dimethoxyethane to give 2.7 g. of $[(C_6H_5)_3P]_3AuB_9H_{12}S$ as colorless crystals which melted at 181–193° C. with decomposition.

*Analysis.*—Calcd. for $C_{54}H_{57}AuB_9P_3S$: C, 57.6; H, 5.1; P, 8.3; B, 8.7; S, 2.9; Au, 17.5. Found: C, 57.9; H, 5.1; P, 7.9; B. 8.6; S, 2.9; Au, 17.5.

The infrared absorption spectrum (KBr wafer) showed B-H absorption at 2555 and 2425 cm.$^{-1}$ (terminal hydrogen) and absorption at 2315 cm.$^{-1}$.

The observed diamagnetic susceptibility was $10^3\chi_{mole}=-0.68\pm0.03$. compared to a value calculated from Pascal's constants of $-0.61\pm0.02$. Crystals of the product were triclinic, with the parameters: $a=13.43$ A.; $b=19.863$ A.; $c=11.180$ A.; $\alpha=103.75°$; $\beta=107.68°$; $\gamma=86.63°$; $Z=2$. The calculated density was $\rho=1.384$; while the experimental density was determined to be $\rho=1.420$.

EXAMPLE 4

$[(C_6H_5)_3P]_3CuB_9H_{14}$

Copper sulfate (1.6 g.) in 50 ml. of water was mixed with triphenylphosphine (5.2 g.) in 150 ml. of ethanol, and $CsB_9H_{14}$ (2.4 g) was added to the mixture. The resulting white precipitate was separated and dissolved in 75 ml. of warm tetrahydrofuran. The solution was concentrated until a solid precipitated. The solid was separated by filtration and purified by recrystallization from an acetone:cyclohexane (2:1) mixture. The recovered material (2 g.) was recrystallized from 1,2-dimethoxyethane to give 0.7 g. of colorless crystals of $$[(C_6H_5)_3P]_3CuB_9H_{14}$$

Another less pure crop of 0.6 g. was obtained from the mother liquor. The pure solid melted with decomposition at 154–156° C.

*Analysis.*—Calcd. for $C_{54}H_{59}B_9CuP_3$: C, 67.4; H, 6.2; P, 9.7; B, 10.1; Cu, 6.6. Found: C, 67.7; H, 6.2, P, 9.3; B, 10.2; Cu, 6.7.

The UV absorption spectrum in $CH_3CN$ showed only one peak, at 2670 A. ($\epsilon$, 24500). The $B^{11}$ N.M.R. spectrum displayed a broad peak at 41.4 p.p.m. The infrared absorption spectrum showed B-H absorptions at 2555 cm.$^{-1}$ (terminal hydrogen) and 2200 cm.$^{-1}$ (bridging hydrogen).

EXAMPLE 5

$[(C_6H_6)_3P]_3AgB_9H_{14}$

A solution of $CsB_9H_{14}$ (2.7 g.) in 50 ml. of ethanol and 10 ml. water was rapidly added to a mixture of 15 g. triphenylphosphine and 1.7 g. of silver nitrate in 160 ml. of ethanol and 10 ml. water. The resulting white solid precipitate was separated by filtration and taken up in 220 ml. of warm tetrahydrofuran, insolubles being removed by filtration. The tetrahydrofuran filtrate was concentrated to about one-third of its original volume. At this point, small crystals started to precipitate. They were separated by filtration and recrystallized from 175 ml. chloroform, and subsequently frim 100 ml. tetrahydrofuran. Yield: 7.0 g. of colorless crystals of $$[(C_6H_5)_3P]_3AgB_9H_{14}$$

(in two crops), M.P. 187–189° C. with decomposition.

*Analysis.*—Calcd. for $C_{54}H_{59}AgB_9P_3$: C, 64.5; H, 5.9; P, 9.2; B, 9.7; Ag, 10.7. Found: C, 64.9; H, 6.4; P, 8.4; B, 9.1; Ag, 10.2.

The $B^{11}$ N.M.R. spectrum showed a broad peak centered at $\delta=40$ p.p.m. The infrared absorption spectrum showed B-H absorption at 2555 cm.$^{-1}$ with a shoulder at 2440 cm.$^{-1}$ (terminal hydrogen) and at 2275 cm.$^{-1}$ (bridging hydrogen).

EXAMPLE 6

$[(C_6H_5)_3P]_3AuB_9H_{14}$

A solution of $NaAuCl_4\cdot 2H_2O$ (3.0 g.) in 40 ml. of ethanol was slowly added to a solution of triphenylphosphine (12 g.) and $CsB_9H_{14}$ (2 g.) in 220 ml. of a 10:1 by volume mixture of ethanol and water. The resulting crude brownish solid precipitate was separated and recrystallized four times from 1,2-dimethoxyethane to give 2.0 g. of colorless crystals of $[(C_6H_5)_3P]_3AuB_9H_{14}$ which melted at 173–175° C. with decomposition.

*Analysis.*—Calcd. for $C_{54}H_{59}AuB_9P_3$: C, 59.2; H, 5.4; B, 8.9; P, 8.5; Au, 18.0. Found: C, 59.3; H, 5.7; B, 8.8; P, 8.0; Au, 18.0.

The infrared absorption spectrum showed B-H absorption at 2555 and 2440 cm.$^{-1}$ (terminal hydrogen) and at absorption 2315 and 2250 cm.$^{-1}$.

By employing the procedure set forth in the foregoing examples, all the compounds of this invention can be prepared.

The compounds of this invention are useful as metal film plating agents. For example, a solution of $$[(C_6H_5)_3P]_3AuB_9H_{12}S$$

in dimethyl sulfoxide on exposure to air for about a day deposited a thin film of gold upon a cleaned glass and metal surface. Under similar conditions, a solution of $$[(C_6H_5)_3P]_3AgB_9H_{14}$$

deposited a film of silver.

The foregoing detailed description has been given for clearness of understanding only and no unnecessary limi- The embodiments of the invention in which an exclusive property or privilege is claimed are defined as follows:

1. Compounds represented by the formula $$(R_3P)_3MZ$$

wherein Z represents a polyboron anion selected from the class consisting of $B_9H_{14}^-$ and $B_9H_{12}S^-$; M represents a metal selected from the class consisting of copper, silver and gold; P represents phosphorus; and each R represents a group of 6–12 carbon atoms selected from the class consisting of aryl and alkaryl.

2. Compounds of claim 1 wherein R is aryl.
3. Compounds of claim 1 wherein R is phenyl.
4. The compound of claim 1 having the formula $$[(C_6H_5)_3P]_3CuB_9H_{14}.$$

5. The compound of claim 1 having the formula $$[(C_6H_5)_3P]_3CuB_9H_{12}S.$$

6. The compound of claim 1 having the formula $$[(C_6H_5)_3P]_3AgB_9H_{14}.$$

7. The compound of claim 1 having the formula $$[(C_6H_5)_3P]_3AgB_9H_{12}S.$$

8. The compound of claim 1 having the formula $$[C_6H_5)_3P]_3AuB_9H_{14}.$$

9. The compound of claim 1 having the formula $$[(C_6H_5)_3P]_3AuB_9H_{12}S.$$

References Cited

UNITED STATES PATENTS

| | | | |
|---|---|---|---|
| 3,217,023 | 11/1965 | Miller | 260—430 XR |
| 3,296,260 | 3/1967 | Knoth | 260—430 XR |
| 3,328,422 | 6/1967 | Knoth | 260—430 XR |

OTHER REFERENCES

Cariati et al.: Gazz. Chim. Ital., vol. 95, pp. 3–15 (1965).

Davidson, Chemistry and Industry (1964), pp. 2021–22.

Cariati et al.: Gazz. Chim. Ital., vol. 95, pp. 201–205 (1965).

TOBIAS E. LEVOW, *Primary Examiner.*

H. M. S. SNEED, *Assistant Examiner.*

U.S. Cl. X.R.

260—438.1; 117—107.2, 124, 131